(12) United States Patent
Huang et al.

(10) Patent No.: US 10,604,639 B2
(45) Date of Patent: *Mar. 31, 2020

(54) THERMALLY-POLYMERIZABLE COMPOSITION AND COMBINED SOLUTION FORMED THEREBY

(71) Applicant: Eternal Materials Co., Ltd., Kaohsiung (TW)

(72) Inventors: Chi-Yu Huang, Kaohsiung (TW); Hsiun-Chia Shih, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,320

(22) Filed: Jan. 13, 2017

(65) Prior Publication Data

US 2018/0057662 A1    Mar. 1, 2018

(30) Foreign Application Priority Data

Aug. 26, 2016    (TW) .............................. 105127370 A

(51) Int. Cl.
*C08K 5/523* (2006.01)
*C08K 5/14* (2006.01)
*C08K 5/00* (2006.01)

(52) U.S. Cl.
CPC ............ *C08K 5/523* (2013.01); *C08K 5/0016* (2013.01); *C08K 5/0025* (2013.01); *C08K 5/14* (2013.01)

(58) Field of Classification Search
CPC combination set(s) only.
See application file for complete search history.

(56) References Cited

U.S. PATENT DOCUMENTS 4,076,742 A * 2/1978 Berlin .................. C09J 4/00
                                                                 526/313
6,664,357 B1 * 12/2003 Edelman ............ C08F 290/067
                                                                 525/250
2013/0004667 A1 * 1/2013 Hood ...................... C08F 12/22
                                                                 427/256
2013/0005854 A1 * 1/2013 Kaneta ................ C08F 299/028
                                                                 523/400
2013/0025495 A1 * 1/2013 Hood ....................... C09D 4/00
                                                                 106/31.13
2017/0324059 A1 * 11/2017 Choi ................... H01L 51/5234

FOREIGN PATENT DOCUMENTS

| CN | 1209140 | 2/1999 |
| CN | 102898962 A * | 1/2013 |
| CN | 106243297 A * | 12/2016 |
| TW | 201406903 | 2/2014 |

OTHER PUBLICATIONS

Physical Constants of the Most Common Solvents for Polymers, Polymer Handbook, 4th edition, 1999. (Year: 1999).*
Table 6. Half-Lives of Organic Peroxides and Azo Compounds Used as Initiators (0.1 mol/L in Benzene), Ullman's Polymers and Plastics-Products and Processes, 4 Volume Set, 2016. (Year: 2016).*
Machine Translation of CN 102898962 A, retrieved Jun. 2018 (Year: 2018).*
Machine translation of CN 106243297 A, retrieved Aug. 2019. (Year: 2019).*
Derwent Abstract of CN 106243297 A, 2017 (Year: 2017).*
"Office Action of Taiwan Counterpart Application," dated Mar. 16, 2017, p. 1-p. 6, in which the listed references were cited.

* cited by examiner

*Primary Examiner* — Nicole M. Buie-Hatcher
(74) *Attorney, Agent, or Firm* — JCIPRNET

(57) ABSTRACT

The invention provides a thermally-polymerizable composition. The thermally-polymerizable composition includes a (meth)acrylate oligomer having one or more functional groups, a thermal initiator, and a plasticizer. The invention also provides a combined solution formed by the thermally-polymerizable composition via a solvent-free thermal polymerization reaction. The combined solution can be used for adhesion, coating, or packaging.

6 Claims, 3 Drawing Sheets

THERMALLY-POLYMERIZABLE COMPOSITION AND COMBINED SOLUTION FORMED THEREBY

CROSS-REFERENCE TO RELATED APPLICATION

This application claims the priority benefit of Taiwan application serial no. 105127370, filed on Aug. 26, 2016. The entirety of the above-mentioned patent application is hereby incorporated by reference herein and made a part of this specification.

BACKGROUND OF THE INVENTION

Field of the Invention

The invention relates to a thermally-polymerizable composition and a combined solution formed thereby, and more particularly, to a solvent-free thermally-polymerizable composition and a combined solution formed by the thermally-polymerizable composition via a solvent-free thermal polymerization reaction.

Description of Related Art

With the rapid development of the information industry, electronic products such as mobile phones, personal digital assistants, and notebook computers have become necessities in everyday life. Among these electronic products, the display is an indispensable human-machine interface. How to provide a lighter and thinner product having better visual effects has always been one of the main objects in the industry. In recent years, the industry further integrated a touch panel and a display panel into a touch display and applied the touch display in various electronic products such that users can directly click the panel to perform various operations, and therefore a more convenient and user-friendly mode of operation is provided.

To make the touch display lighter and thinner and have better visual effect, the industry not only developed various stacking methods, but also strives for breakthroughs in lamination techniques. In the lamination technique aspect, full lamination allows two laminate boards to be completely laminated by an adhesive layer without any gap and air, and therefore the backlight of the display panel can better pass through the stacked layers without a reflection phenomenon caused by different indices of refraction of the transfer media (about 1.52 for the glass protective layer and about 1 for air) and causing reduced brightness of the display screen or glare under strong lighting conditions. Full lamination not only can provide a screen having higher quality, bonding strength and panel impact resistance can also be increased.

FIG. 1 is a schematic of a known touch display adopting a full lamination technique. FIG. 2 is a cross-sectional schematic of a known touch display adopting a full lamination technique. A touch display 1 contains a touch panel 10, an adhesive layer 12, and a display panel 20, wherein the adhesive layer 12 contains a liquid optically clear adhesive (LOCA) 14 and a curable sealant 16.

The LOCA 14 is used to laminate the touch panel 10 to the display panel 20, and the LOCA 14 generally has lower viscosity so as to be uniformly distributed during lamination to achieve better lamination. The LOCA 14 has lower viscosity. The sealant 16 generally has high viscosity, and the main object thereof is to prevent the situation of excess adhesive to the LOCA 14, which is particularly desired for the lamination of large panels. The sealant 16 can further block the LOCA 14 from seeping into a slit 22 between the liquid crystal panel 20 and the frame to prevent contamination to the liquid crystals.

During lamination, the sealant 16 is generally first coated around the edge of the display panel 20 once in a manner of dispensing and curing the sealant 16 at the same time to form a blocking wall having a fixed height. The cured sealant 16 and the display panel 20 form a groove capable of accommodating the LOCA 14. Next, the LOCA 14 is coated in the groove in a Y-shaped or H-shaped dispensing path, and then the upper and lower panels are laminated. During the lamination process, the cured sealant 16 can maintain a fixed gap between the two panels.

Based on the type of the polymer composition, the LOCA 14 currently used by the industry can be divided into rubber optical adhesives and acrylic optical adhesives. The rubber optical adhesive has been in the market longer, and contains, for instance, components of elastic polymer such as polyisoprene, polybutadiene, or polyurethane. Although the rubber optical adhesive has advantages such as good yellowing resistance, flexibility, high adhesion, and high index of refraction, the raw material thereof is more expensive and residual adhesive readily occurs in heavy processing, such that the yield is reduced. As a result, overall production costs are higher.

The acrylic optical adhesive developed later contains, for instance, polyacrylate polymer. Although the acrylic optical adhesive also has the characteristics of high transparency, high adhesion, and good yellowing resistance, the price of the raw material thereof is lower, residual adhesive does not occur and the acrylic optical adhesive can be applied in heavy processing, and overall production costs are lower. Therefore, more and more manufacturers select acrylic optical adhesive as the LOCA 14 for the lamination of the touch panel 10 and the display panel 20.

Currently, different LOCAs 14 are developed by the industry for the demands of different products and different lamination machines, such as a LOCA 14 having a specific dielectric constant or viscosity range, and a sealant 16 matching the specific LOCA 14 is manufactured in addition.

In general, as described above, the lamination state between the touch panel and the display panel can be done via a sealant and a LOCA having optical transparency. However, since the viscosities of the sealant and the LOCA are different, the indices of refraction and optical properties of the sealant and the LOCA often do not match. As a result, a clearly-distinguishable interface is produced at the junction of the sealant and the LOCA, and visual effects are affected.

SUMMARY OF THE INVENTION

Accordingly, the invention provides a thermally-polymerizable composition that does not require an organic solvent, and a combined solution made from the thermally-polymerizable composition can be applied in an optical device such as a touch display as a sealant and provides matching indices of refraction and optical properties and good compatibility to the sealant and a corresponding LOCA.

One object of the invention is to provide a thermally-polymerizable composition. The thermally-polymerizable composition includes a (meth)acrylate oligomer having one or more functional groups, a thermal initiator, and a plasticizer.

Another object of the invention is to provide a combined solution formed by the thermally-polymerizable composition via a solvent-free thermal polymerization reaction.

Based on the above, in the thermally-polymerizable composition of the invention, by including a (meth)acrylate oligomer having one or more functional groups, a thermal initiator, and a plasticizer, a combined solution can be prepared by performing a thermal-polymerization reaction without the use of an organic solvent, the combined solution can be applied in an optical device such as a touch display as a sealant, and the sealant and a corresponding LOCA can have matching indices of refraction and optical properties and good compatibility. The combined solution can also be applied in the field of coating or packaging material.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
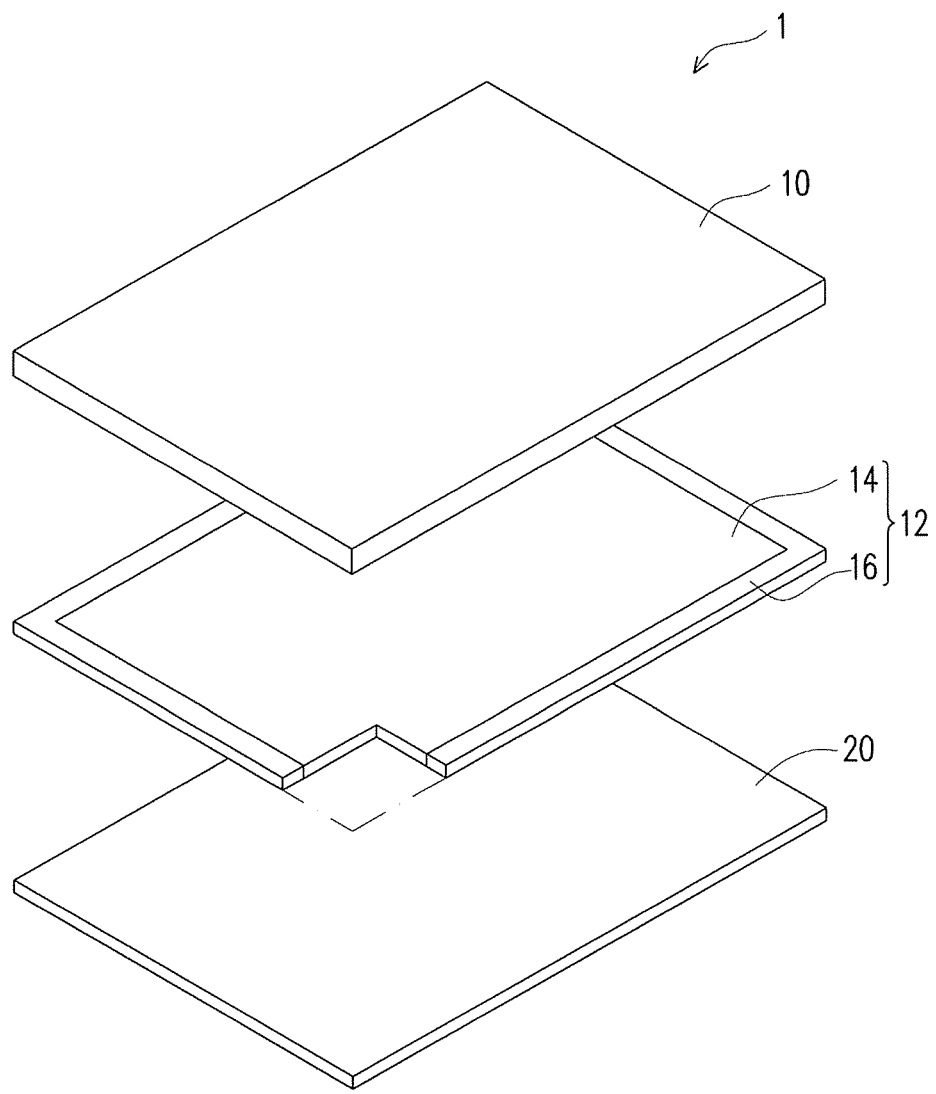
FIG. 1 is a schematic of a known touch display adopting a full lamination technique.
Figure 2:
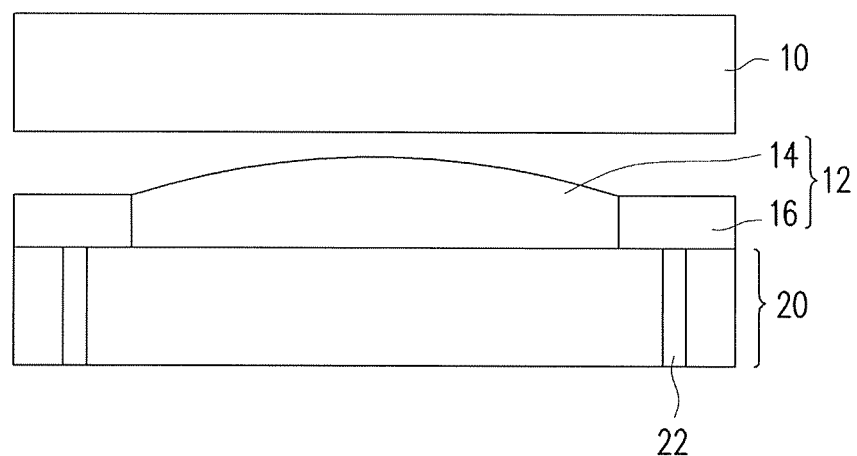
FIG. 2 is a cross-sectional schematic of a known touch display adopting a full lamination technique.

It should be mentioned that, all of the figures are presented in a schematic manner. For convenience and clarity, the relative size and ratios of some components of the figures are presented in an exaggerated or reduced manner. The same reference numerals are generally used in different embodiments to indicate the corresponding or similar devices.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and the smaller numerical range in the specification.

The invention first provides a thermally-polymerizable composition. The thermally-polymerizable composition contains a (meth)acrylate oligomer having one or more functional groups, a thermal initiator, and a plasticizer.

In an embodiment of the invention, the boiling point of the plasticizer is higher than the thermal polymerization initiation temperature of the thermal initiator.

Specifically, in the present embodiment, based on a total weight of the thermally-polymerizable composition, the amount of the plasticizer is 40 wt % to 94.99 wt %, preferably 50 wt % to 85 wt %; the amount of the (meth)acrylate oligomer having one or more functional groups is 5 wt % to 50 wt %, preferably 10 wt % to 35 wt %, more preferably 15 wt % to 25 wt %; the amount of the thermal initiator is 0.01 wt % to 10 wt %, preferably 0.01 wt % to 6 wt %. If the amount of the thermal initiator is greater than 10 wt % based on the total weight of the thermally-polymerizable composition, then the reaction rate of the composition is too fast due to too much of the thermal initiator, such that uncontrolled gelling occurs in the reaction; and if the amount of the thermal initiator is less than 0.01 wt % based on the total weight of the thermally-polymerizable composition, then incomplete polymerization occurs due to too little of the thermal initiator in thermal polymerization. Moreover, in the present embodiment, the viscosity of the thermally-polymerizable composition is between 2000 cps and 300000 cps.

More specifically, in the present embodiment, the type of the (meth)acrylate oligomer includes, but is not limited to: urethane (meth)acrylate such as aliphatic urethane (meth)acrylate, aromatic urethane (meth)acrylate, aliphatic urethane di(meth)acrylate, aromatic urethane di(meth)acrylate, siliconized urethane (meth)acrylate, aliphatic urethane hexa(meth)acrylate, aromatic urethane hexa(meth)acrylate; epoxy (meth)acrylate such as bisphenol-A epoxy di(meth)acrylate, novolac epoxy (meth)acrylate; polyester (meth)acrylate such as polyester di(meth)acrylate; (meth)acrylate; or a mixture thereof. In the present embodiment, the (meth)acrylate oligomer is preferably urethane (meth)acrylate.

Moreover, in the present embodiment, the (meth)acrylate oligomer can also adopt a commercial product. Examples of the commercial product suitable for the (meth)acrylate oligomer include: 6101-100, 611A-85, 6112-100, 6113, 6114, 6123, 6127, 6131, 6144-100, 6145-100, 6150-100, 6160B-70, 621A-80, 621-100, EX-06, 6315, 6320, 6323-100, 6325-100, 6327-100, 6336-100, or 6361-100 (made by Eternal); CN9001, CN9002, CN9004, CN9006, CN9014, CN9021, CN963J75, CN966J75, CN973J75, CN962, CN964, CN965, CN940, CN945, or CN990 (made by Sartomer); or O-888 (provided by Ji Zhenghong).

In the present embodiment, the thermal initiator is not particularly limited, and under the thermal polymerization initiation temperature of the thermal initiator, the thermal initiator generates a free radical, and the free radical initiates the polymerization reaction of a first (meth)acrylate oligomer. Moreover, in the present embodiment, the boiling point of the plasticizer is higher than the thermal polymerization initiation temperature of the thermal initiator to prevent boiling of the plasticizer causing poor homogeneous reaction. Moreover, in the present embodiment, preferably, the boiling point of the plasticizer and the decomposition temperature of the plasticizer are both higher than the thermal polymerization initiation temperature of the thermal initiator to prevent boiling or decomposition of the plasticizer.

Specifically, in the present embodiment, the thermal initiator can be any thermal initiator known to those having ordinary skill in the art, and is, for instance, a thermal decomposition initiator, but is not limited thereto. According to an embodiment of the invention, the thermal initiator is selected from the group consisting of: benzoyl peroxide, cumyl hydroperoxide, dicumyl peroxide, tert-butyl hydroperoxide, tert-butyl monoperoxymaleate, acetyl peroxide, dilauroyl peroxide, a mixture of one or more peroxides and amino acid or sulfonic acid, a mixture of one or more peroxides and a cobalt-containing compound, azobisisobutyronitrile (AIBN), and a mixture of the substances. In the present embodiment, a preferred thermal initiator is selected from the group consisting of tert-butyl hydroperoxide, tert-butyl monoperoxymaleate, acetyl peroxide, dilauroyl peroxide, and a mixture thereof.

The thermally-polymerizable composition provided by the invention does not require an organic solvent, and a plasticizer is used to replace the traditional organic solvent as a medium of the thermal polymerization reaction. Therefore, the steps of solvent dissipation in the solvent thermal polymerization reaction and then removing the organic solvent from the product can be omitted, and since an additional treatment or recycling step is not needed, environmental demands are met and costs can be reduced. The plasticizer used in the invention requires the characteristics of high-temperature resistance and low volatility, and the boiling point of the plasticizer is higher than the thermal polymerization initiation temperature of the thermal initiator.

The amount of the plasticizer of the invention needs to be sufficient such that a constituent monomer and the thermal initiator can be uniformly mixed to facilitate the polymerization reaction and prevent the issue of non-uniform reaction or heat dissipation caused by excessive viscosity in the reaction process. According to an embodiment of the invention, the amount of the plasticizer is based on the total weight of the thermally-polymerizable composition, and is 40% to 94.99%, preferably 50% to 85%.

In the present embodiment, the plasticizer contains a first plasticizer, and the boiling point of the first plasticizer is higher than the thermal polymerization initiation temperature of the thermal initiator. The first plasticizer is an inert organic substance, and the first plasticizer is in liquid state and can be combined with a (meth)acrylate oligomer via a physical method to produce a homogeneous phase.

In the present embodiment, the first plasticizer has an index of refraction of 1.5 or above, preferably 1.52 or above. Moreover, in the present embodiment, the type of the first plasticizer is known to those having ordinary skill in the art, and includes, for instance: phthalate, aliphatic dibasic ester, phosphate, benzene polyacid ester, alkyl sulfonate, polyol ester, epoxy compound, or a mixture thereof. In the present embodiment, the first plasticizer preferably includes phthalate, phosphate, or a mixture thereof. Moreover, in the present embodiment, the first plasticizer can include a single kind of plasticizer or different kinds of plasticizers.

In an embodiment, the first plasticizer includes the phosphate represented by formula 2, formula 3, or formula 4:

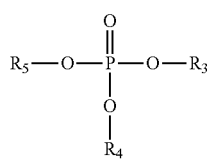

formula 2

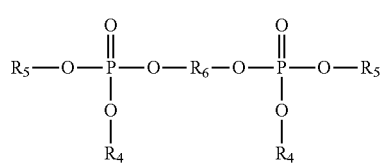

formula 3

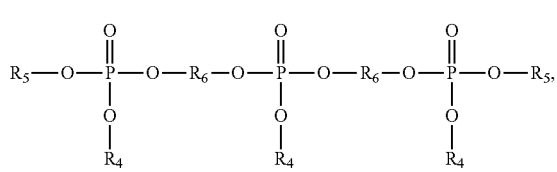

formula 4 wherein $R_3$, $R_4$, and $R_5$ are each independently a straight-chain or branched $C_1$-$C_{12}$ alkyl group or phenyl group, the phenyl group is not substituted or is substituted by 1, 2 or 3 straight-chain or branched $C_1$-$C_4$ alkyl groups; $R_6$ is a straight-chain or branched $C_1$-$C_{12}$ alkylene group or phenylene group, the phenylene group is not substituted or is substituted by 1, 2 or 3 straight-chain or branched $C_1$-$C_4$ alkyl groups.

In another embodiment, the first plasticizer includes the phosphate represented by formula 5:

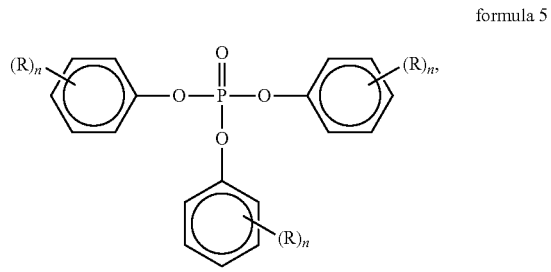

formula 5 wherein each n is independently 0, 1, 2, or 3, and each R is independently a straight-chain or branched $C_1$-$C_4$ alkyl group, preferably a methyl group.

In yet another embodiment, the first plasticizer includes the phosphate represented by formula 6:

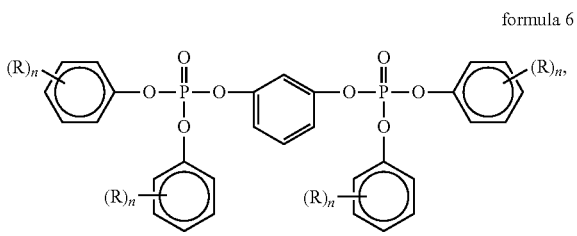

formula 6 wherein each n is independently 0, 2, or 3, and each R is independently a straight-chain or branched $C_1$-$C_4$ alkyl group, preferably a methyl group.

Specifically, in the present embodiment, as the first plasticizer, the phosphate is preferably triphenyl phosphate (TPP), tricresyl phosphate (TCP), tri(isopropylphenyl)phosphate, cresyl diphenyl phosphate, tetraphenyl resorcinol diphosphate, tetraphenyl 4,4'-(propane-2,2-diyl)bis(4,1-phenylene)diphosphate, or a mixture thereof.

If needed, to improve the dropwise addition effect of the thermal initiator, the plasticizer can further contain a second plasticizer. In the present embodiment, the first plasticizer and the second plasticizer can be the same or different, and descriptions of the type, structure, and properties of the second plasticizer used here are as provided for the first plasticizer and are not repeated herein. In the present embodiment, based on the total weight of the thermally-polymerizable composition, the amount of the first plasticizer is 20 wt % to 75 wt %, preferably 30 wt % to 70 wt %; the amount of the second plasticizer is 2 wt % to 60 wt %, preferably 3 wt % to 30 wt %.

The invention further provides a combined solution formed by the thermally-polymerizable composition via a solvent-free thermal polymerization reaction.

The solvent-free thermal polymerization reaction of the invention contains the following steps. A first reactant is provided to a batch reactor, wherein the first reactant includes a first (meth)acrylate oligomer and a first plasticizer. The first reactant is deaerated if the first reactant is not deaerated. A second reactant is added in the batch reactor dropwise and mixed with the first reactant to form a thermal-polymerizable composition, wherein the second reactant includes a thermal initiator. And, the solvent-free thermal polymerization reaction of the thermal-polymerizable composition is carried out. Descriptions of the type, structure, and properties of the (meth)acrylate oligomer, the first plasticizer, and the thermal initiator are as provided above.

Figure 3:
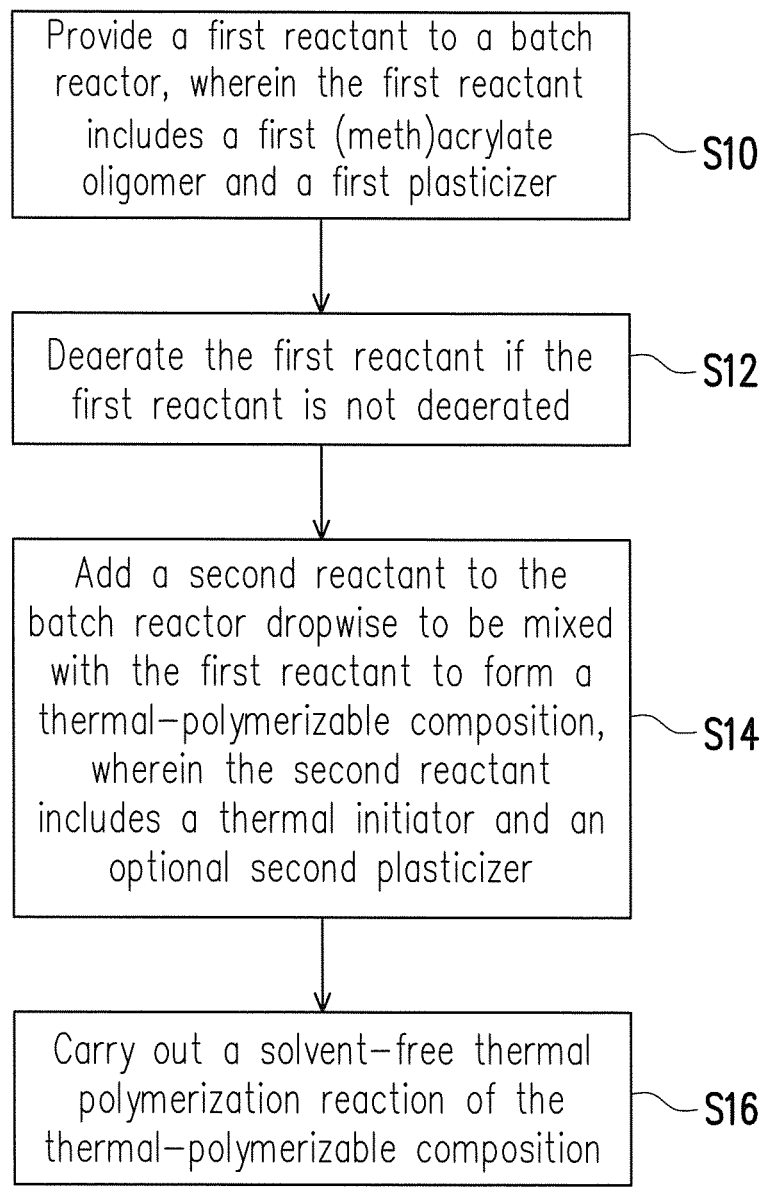
FIG. 3 is a preparation flowchart of the combined solution according to an embodiment of the invention.

FIG. 3 is a preparation flowchart of the combined solution according to an embodiment of the invention.

First, referring to FIG. 3, step S10 is performed to provide a first reactant to a batch reactor, wherein the first reactant includes a first (meth)acrylate oligomer and a first plasticizer. Specifically, in the present embodiment, the first (meth)acrylate oligomer is a (meth)acrylate oligomer having one or more functional groups, preferably a (meth)acrylate oligomer having functional groups, and the first (meth)acrylate oligomer can undergo a free radical polymerization reaction.

In the present embodiment, the first plasticizer is an inert organic substance, and the first plasticizer is in liquid state and can be combined with the first (meth)acrylate oligomer via a physical method to produce a homogeneous phase. In other words, in the present embodiment, the first reactant is a liquid substance without the addition of an organic solvent (i.e., organic solvent-free). In this way, in the present embodiment, an organic solvent harmful to the environment does not need to be used during the preparation of the first reactant, and therefore environmental-friendliness is achieved.

Moreover, the batch reactor refers to a container discharging the product only upon completion of the reaction that does not discharge the product continuously during the reaction. Specifically, the raw material can be added to the container all at once before the reaction, gradually added in the container during the reaction, or continuously added in the container at a certain stage during the reaction, and the reaction is performed for the necessary duration to obtain the polymer characteristics including, for instance, the desired polymerization reaction amount and molecular weight under such circumstance. If needed, an additive can be mixed into the batch before the product is discharged. When the treatment is complete, the product is discharged from the reaction vessel.

In the present embodiment, the batch reactor includes a pressure container formed by a material (such as stainless steel) suitable for a polymerization reaction commonly used in many types of free radical polymerization reactions. Specifically, the pressure container generally has an aperture for, for instance, adding raw material, discharging product, emergency pressure relief, applying pressure to the reactor using an inert gas, and turning the top space of the reactor into vacuum. Moreover, the pressure container is generally partially packaged in a jacket to make the heat transfer fluid (such as water) pass through the jacket to heat and cool the contents in the container. Moreover, the pressure container generally includes a stirring mechanism, such as an electric axis inserted in the container and provided with a stirring paddle.

Next, referring to FIG. 3, in step S12, the first reactant is deaerated if the first reactant is not deaerated. Specifically, the deaeration process can be performed by any method known to those having ordinary skill in the art. For instance, deaeration can be achieved by introducing an inert gas (such as nitrogen) and making the inert gas bubble to replace the dissolved oxygen with the first reactant.

Next, referring to FIG. 3, step S14 is performed to add a second reactant in the batch reactor dropwise to be mixed with the first reactant to form a thermally-polymerizable composition, wherein the second reactant includes a thermal initiator, and to improve the dropwise addition effect of the thermal initiator, the second reactant can optionally contain a second plasticizer. Specifically, in the present embodiment, the thermally-polymerizable composition can include a second plasticizer or not include a second plasticizer. Descriptions of the type, structure, and properties of the second plasticizer are as provided above.

Moreover, to increase the functionality of the combined solution, the second reactant can further include a (meth)acrylate monomer. In other words, when the second reactant includes a (meth)acrylate monomer, after the step in which the thermally-polymerizable composition is reacted in a solvent-free thermal polymerization reaction (relevant descriptions are provided below), the combined solution includes a copolymer of the first (meth)acrylate oligomer and the (meth)acrylate monomer.

The (meth)acrylate monomer is selected from the group consisting of a monofunctional (meth)acrylate monomer, a polyfunctional (meth)acrylate monomer, and a mixture thereof Specifically, in the present embodiment, the monofunctional (meth)acrylate monomer can be selected from (but not limited to) the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, 3,3,5-trimethyl cyclohexane acrylate, ortho-phenyl phenoxy ethyl acrylate, cumyl phenoxyl ethyl acrylate, lauryl methacrylate, isooctyl acrylate, stearyl methacrylate, isodecyl acrylate, isoborny methacrylate, benzyl acrylate, 2-hydroxyethyl methacrylate phosphate, caprolactone acrylate, hydroxyethyl acrylate (HEA), 2-hydroxyethyl methacrylate (HEMA), and a mixture thereof.

Moreover, in the present embodiment, the polyfunctional (meth)acrylate monomer can be selected from (but not limited to) the group consisting of hydroxypivalyl hydroxypivalate diacrylate, 1,6-hexanediol diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl)isocyanurate, trimethylolpropane triacrylate, and a mixture thereof.

Moreover, in the present embodiment, the (meth)acrylate monomer preferably has a glass transition temperature less than 50° C., such as: 2-phenoxy ethyl acrylate, lauryl methacrylate, isodecyl acrylate, trimethylolpropane trimethacrylate, pentaerythritol tetraacrylate, ethoxylated trimethylolpropane trimethacrylate, propoxylated glycerol trimethacrylate, or trimethylolpropane triacrylate.

Moreover, in the present embodiment, the (meth)acrylate monomer can also adopt a commercial product. Examples of the commercial product suitable for the (meth)acrylate monomer include: EM223, EM328, EM2308, EM231, EM219, EM90, EM70, EM235, EM2381, EM2382, EM2383, EM2384, EM2385, EM2386, EM2387, EM331, EM3380, EM241, EM2411, EM242, EM2421, or EM265 (made by Eternal).

Specifically, in the present embodiment, based on the total weight of the thermally-polymerizable composition, the total amount of the plasticizer is 40 wt % to 94.99 wt %, preferably 50 wt % to 85 wt %, and the plasticizer contains a first plasticizer and an optional second plasticizer; the amount of the first (meth)acrylate oligomer is 5 wt % to 50 wt %, preferably 15 wt % to 35 wt %; the amount of the thermal initiator is 0.01 wt % to 10 wt %, preferably 0.01 wt % to 6 wt %. Moreover, the amount of the (meth)acrylate monomer is 0 wt % to 15 wt %, preferably 2 wt % to 10 wt %. Under the condition that the (meth)acrylate monomer is present, the total amount of the first plasticizer and the second plasticizer is 40 wt % to 92.99 wt %, the amount of the first (meth)acrylate oligomer is 5 wt % to 50 wt %, and the amount of the thermal initiator is 0.01 wt % to 10 wt %. In the present embodiment, the viscosity of the thermally-polymerizable composition is between 2000 cps and 300000 cps.

Moreover, the second reactant is deaerated before the second reactant is added in the batch reactor dropwise in the case that the second reactant is not deaerated. Similarly, the deaeration process can be performed by any method known to those having ordinary skill in the art. For instance, deaeration can be achieved by introducing an inert gas (such as nitrogen) and making the inert gas bubble to replace the dissolved oxygen with the second reactant. At this point, after the second reactant is deaerated and debubbled, the second reactant is added in the batch reactor dropwise, wherein the speed of dropwise addition is controlled at 0.1 cc/min to 5.0 cc/min.

Next, referring to FIG. 3, step S16 is performed to carry out a solvent-free thermal polymerization reaction of the thermally-polymerizable composition to form a combined solution. Specifically, in the present embodiment, the method of forming the combined solution includes, for instance: continuously stirring the thermally-polymerizable composition and heating the thermally-polymerizable composition to the thermal polymerization initiation temperature of the thermal initiator to perform a solvent-free thermal polymerization reaction, wherein conditions such as the reaction time can be adjusted as needed based on, for instance, the type and amount of the first (meth)acrylate oligomer, the first plasticizer, and the thermal initiator. In an embodiment, the thermal polymerization initiation temperature of the thermal initiator is between 50° C. and 200° C., and the reaction time of the solvent-free thermal polymerization reaction is between 0.5 hours and 10 hours. From another perspective, in the present embodiment, the first (meth)acrylate oligomer is a reactive (meth)acrylate oligomer.

To prevent the presence of the thermal initiator in the combined solution upon completion of the thermal polymerization reaction of the first (meth)acrylate oligomer, after the solvent-free thermal polymerization reaction of the thermally-polymerizable composition is carried out, if needed, a third reactant is further added in the batch reactor dropwise, wherein the third reactant can be selected from a second (meth)acrylate oligomer, a (meth)acrylate monomer, and a combination thereof. In other words, by adding the third reactant dropwise to react with the remaining thermal initiator in the solvent-free thermal polymerization reaction, the remaining thermal initiator can be consumed.

In the present embodiment, the first (meth)acrylate oligomer and the second (meth)acrylate oligomer can be the same or different. Specifically, descriptions of the type, structure, and properties of the second (meth)acrylate oligomer used here are as provided for the first (meth)acrylate oligomer and are not repeated herein; and descriptions of the (meth)acrylate monomer are as provided above and are also not repeated herein.

Moreover, if needed, to improve the dropwise addition effect of the second (meth)acrylate oligomer, the third reactant can further include a third plasticizer. From another perspective, in the present embodiment, an organic solvent harmful to the environment also does not need to be used during the preparation of the third reactant, and therefore environmental-friendliness is achieved.

Moreover, descriptions of the type, structure, and properties of the third plasticizer used here are as provided for the first plasticizer and are not repeated herein. Moreover, in the present embodiment, the first plasticizer, the second plasticizer, and the third plasticizer can be the same or different.

Moreover, the third reactant is deaerated before the third reactant is added in the batch reactor dropwise in the case that the third reactant is not deaerated. Similarly, the deaeration process can be performed by any method known to those having ordinary skill in the art. For instance, deaeration can be achieved by introducing an inert gas (such as nitrogen) and making the inert gas bubble to replace the dissolved oxygen with the second reactant.

If needed, to end the thermal polymerization reaction or prevent the occurrence of any possible polymerization reaction, the preparation method of the combined solution further includes adding a polymerization inhibitor in the batch reactor. Specifically, the polymerization inhibitor can be any polymerization inhibitor known to those having ordinary skill in the art, such as: mono methyl ether hydroquinone (MEHQ), hydroquinone, or dibutyl hydroxytoluene (BHT).

It should be mentioned that, as described above, an organic solvent harmful to the environment is not needed regardless of whether the first reactant, the second reactant, or the third reactant is prepared, and the combined solution is obtained by performing a solvent-free thermal-polymerization reaction. As a result, the preparation method of the combined solution of the present embodiment has the advantage of environmental friendliness.

It should be mentioned that, as described above, in the present embodiment, since the combined solution is formed by the thermally-polymerizable composition a solvent-free thermal-polymerization reaction, the combined solution includes a polymer having a (meth)acrylate oligomer unit formed by the first (meth)acrylate oligomer in a thermal-polymerization reaction and a plasticizer. Specifically, since the molecular weight of the polymer having a (meth)acrylate oligomer unit must be greater than the molecular weight of the first (meth)acrylate oligomer, the viscosity of the combined solution is greater than the viscosity of the thermally-polymerizable composition. In an embodiment, the viscosity of the combined solution is between 2000 cps and 200000 cps.

Moreover, as described above, since the first (meth)acrylate oligomer can include a single kind of (meth)acrylate oligomer or different kinds of (meth)acrylate oligomers, and since the second reactant can further include a (meth)

acrylate monomer, the polymer having a (meth)acrylate oligomer unit can be an homopolymer having a (meth)acrylate oligomer unit or a copolymer having a (meth)acrylate oligomer unit. In the present specification, "homopolymer" is defined as a polymer obtained from the polymerization of a single kind of oligomer, and "copolymer" is defined as a polymer obtained from the polymerization of different kinds of oligomers or an oligomer and a monomer.

From another perspective, since the polymer having a (meth)acrylate oligomer unit in the combined solution is obtained from the polymerization of the first (meth)acrylate oligomer, the compositions of the two are very similar, and therefore the combined solution and the thermally-polymerizable composition have good compatibility. More specifically, since the (meth)acrylate oligomer and the plasticizer that can undergo a free radical polymerization are generally the main components of a LOCA, the combined solution can be suitable for an adhesive composition. In the following, the combined solution is applied in an adhesive composition as an example.

In an embodiment, the adhesive composition includes the combined solution, the (meth)acrylate monomer, and the initiator of any of the above embodiments. Descriptions of the combined solution and the (meth)acrylate monomer are as provided in the above embodiments, and are therefore not repeated herein.

Moreover, in the present embodiment, the (meth)acrylate monomer has bridging function and the function of viscosity adjustment. More specifically, by including the (meth)acrylate monomer, the adhesive composition has high crosslinking density after curing, and therefore the plasticizer therein is not readily precipitated, and environmental issues are not produced.

The initiator is not particularly limited as long as the initiator rapidly produces a free radical after heat energy is provided or after light irradiation and can initiate a polymerization reaction via the transmission of the free radical. Specifically, the initiator contains a photoinitiator and a thermal initiator. The photoinitiator is, for instance, but not limited to: benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, or a mixture thereof. In the present embodiment, a preferred photoinitiator is benzophenone, 1-hydroxy cyclohexyl phenyl ketone, or 2,4,6-trimethylbenzoyl diphenyl phosphine oxide.

Moreover, descriptions of the type, structure, and properties of the thermal initiator used here are as provided for the thermal initiator in the above embodiments and are not repeated herein.

If needed, to adjust the viscosity of the adhesive composition, the adhesive composition can further include a non-reactive diluent, such as a liquid or solid plasticizer. Descriptions of the type, structure, and properties of the liquid plasticizer used here are as provided for the first plasticizer in the above embodiments and are not repeated herein. Moreover, to satisfy the demand for higher index of refraction, a solid plasticizer is selected for use, such as the fluorene diester represented by formula 1:

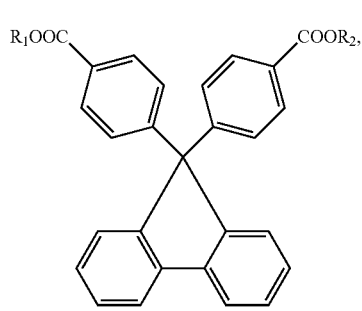

formula 1 wherein $R_1$ and $R_2$ are each independently a straight-chain or branched $C_1$-$C_{18}$ alkyl group, $C_3$-$C_8$ cycloalkyl group, $C_2$-$C_8$ alkenyl group, or $C_6$-$C_{14}$ arylalkoxy group, and are preferably each independently a methyl group, ethyl group, propyl group, butyl group, pentyl group, hexyl group, heptyl group, octyl group, nonyl group, decyl group, undecyl group, propenyl group, cyclopropyl group, cyclobutyl group, cyclopentyl group, cyclohexyl group, or benzyl group.

If needed, to meet property requirements, the adhesive composition can further include a (meth)acrylate oligomer having one or more functional groups. Descriptions of the type, structure, and properties of the (meth)acrylate oligomer having one or more functional groups are as provided for the first (meth)acrylate oligomer in the above embodiments and are not repeated herein.

It should be mentioned that, in the present embodiment, the amount of each component (i.e., combined solution, (meth)acrylate monomer, and initiator . . . etc.) in the adhesive composition is not particularly limited. Specifically, as described above, the (meth)acrylate oligomer and plasticizer that can undergo a free radical polymerization are generally the main components of a LOCA, and the combined solution is obtained by carrying out a thermal-polymerization reaction of the first (meth)acrylate oligomer in the presence of a plasticizer (i.e., first plasticizer, or first and second plasticizers, or first, second, and third plasticizers), and therefore by adjusting the amount of each component in the adhesive composition based on the ratios of the components in the specific LOCA composition, an adhesive composition having a similar composition and the same component ratios with a corresponding LOCA composition can be obtained. In an embodiment, based on the total weight of the adhesive composition, the amount of the combined solution is about 40.0 wt % to about 95.0 wt %, the amount of the (meth)acrylate monomer is about 0.5 wt % to about 30.0 wt %, and the amount of the initiator is about 0.01 wt % to about 10.0 wt %.

More specifically, as described above, since the first (meth)acrylate oligomer forms a polymer having a (meth)acrylate oligomer unit having a greater molecular weight after polymerization, in the case that the compositions are similar and component ratios are the same, the viscosity of the adhesive composition is greater than the viscosity of the LOCA composition. As a result, the adhesive composition can be used as a sealant composition and applied in the process of a touch display with a corresponding LOCA composition. In an embodiment, the viscosity of the adhesive composition is between 8000 cps and 100000 cps, and the viscosity of the LOCA composition is between 600 cps and 7500 cps.

More specifically, as described above, since the compositions of the adhesive composition and the corresponding LOCA composition are similar and the component ratios thereof are the same, the two have matching indices of refraction and optical properties and good compatibility. As a result, when the adhesive composition is used as a sealant composition and applied in the process of a touch display with a corresponding LOCA composition, a clearly-distinguishable interface is not formed at the junction of the sealant and the LOCA after curing, and as a result, the touch display has excellent visual effect.

Moreover, as described above, the adhesive composition includes a plasticizer having an index of refraction no less than 1.5, and therefore the adhesive composition can have both good light-transmitting properties and high index of refraction after curing. Moreover, by including a plasticizer, the adhesive composition has good softness and flexibility, and therefore is suitable for an optical electronic product, in particular a touch display.

Moreover, in the present embodiment, the adhesive composition can further contain any additive known to those having ordinary skill in the art, and includes, for instance, but is not limited to: a chain transfer agent, synergist, sensitizer, coupling agent, dispersing agent, wetting agent, thinning agent, defoamer, anti-yellowing agent, flame retardant, or thixotropic agent.

Specifically, in the present embodiment, the chain-transfer agent is selected from the group consisting of PETA-MAP, 2-MBT, 2-MBO, MMT, N-phenyl glycine, 1,1-dimethyl-3,5-dionecyclohexane, 2-mercaptobenzimidazole, pentaerythritol tetrakis(mercaptoacetate), 4-acetylglucosamine thiophenol, mercapto succinaic acid, dodecyl mercaptan, β-mercaptoethanol, carbon tetrabromide, dimethyl-aniline, ethyl mercaptan, butyl mercaptan, tert-butyl mercaptan, thiophenol, ethyl thioglycolate, and a mixture thereof. Based on the total weight of the adhesive composition, the amount of the chain-transfer agent is about 0.01 wt % to about 10 wt %, preferably about 0.1 wt % to about 5.0 wt %.

More specifically, since the phosphate plasticizer has flame retardance effect, a phosphate first plasticizer is used in the preparation of the combined solution, and a flame retardant is not needed for the adhesive composition. As a result, the possibility of combustion to the material can be reduced, and the occurrence of fire hazard is reduced. As described above, the phosphate plasticizer suitable for the invention is preferably TPP, TCP, tri(isopropylphenyl)phosphate, cresyl diphenyl phosphate, tetraphenyl resorcinol diphosphate, tetraphenyl 4,4'-(propane-2,2-diyl)bis(4,1-phenylene)diphosphate, or a mixture thereof.

The features of the invention are more specifically described in the following with reference to examples 1 to 18. Although the following examples are described, the materials used and the amount and ratio thereof, as well as handling details and handling process . . . etc., can be suitably modified without exceeding the scope of the invention. Accordingly, restrictive interpretation should not be made to the invention based on the examples described below.

Information of the main materials used in the preparation of the combined solutions of examples 1 to 18 is as shown below.

(Meth)acrylate oligomer:

CN9021 made by Sartomer;

O-888 (polyester PU type diacrylate) provided by Ji Zhenghong;

6113 (aliphatic urethane diacrylate) made by Eternal.

Plasticizer:

Tricresyl phosphate: made by GO YEN Chemical Industrial Co., Ltd (GYC);

Tetraphenyl resorcinol diphosphate: made by GYC.

Thermal initiator:

Lauroyl peroxide: made by Aldrich.

(Meth)acrylate monomer:

Caprolactone acrylate: SR495B made by Sartomer.

EXAMPLE 1

First, 100 g of CN9021, 200 g of tricresyl phosphate, and 100 g of tetraphenyl resorcinol diphosphate were added in a batch reactor and sufficiently mixed to form a first reactant. Next, the first reactant was deaerated and debubbled and then heated to 120° C. Next, 100 g of tricresyl phosphate and 0.05 g of lauroyl peroxide were sufficiently mixed to obtain a second reactant. Next, after the second reactant was deaerated and debubbled, the second reactant was added in the batch reactor dropwise, wherein the speed of dropwise addition was controlled at 1.0 cc/min. Upon completion of the dropwise addition, the reaction was ended after 2.0 hours at a temperature of 120° C. to obtain the combined solution of example 1.

EXAMPLES 2 TO 9

The combined solutions of example 2 to example 9 were prepared based on the same preparation process as example 1, and the main difference is: the amount and type of each component in the first reactant and the second reactant as shown in Table 1.

EXAMPLES 10 TO 18

The combined solutions of example 10 to example 18 were prepared based on the same preparation process as example 1, and the main difference is: the amount and type of each component in the first reactant and the second reactant as shown Table 2.

Next, measurement of viscosity was respectively performed on the combined solutions of example 1 to example 9, and the results of the measurement are shown in Table 1. Measurement of viscosity was respectively performed on the combined solutions of example 10 to example 18, and the results of the measurement are shown in Table 2. Moreover, details of the viscosity measurement method are as follows.

<Measurement of Viscosity>

Measurement of viscosity was respectively performed on the combined solutions of example 1 to example 18 at 25° C. using a viscometer (Brookfield LV made by BROOKFIELD).

TABLE 1

|  |  | Example | | | | | | | | |
|---|---|---|---|---|---|---|---|---|---|---|
|  |  | 1 | 2 | 3 | 4 | 5 | 6 | 7 | 8 | 9 |
| First reactant | CN9021 (g) | 100 | 100 | 100 | 100 | — | — | — | — | — |
|  | O-888 (g) | — | — | — | — | 100 | 100 | 100 | 100 | 100 |
|  | Tricresyl phosphate (g) | 200 | 250 | 250 | 250 | 250 | 250 | 250 | 250 | 350 |
|  | Tetraphenyl resorcinol diphosphate (g) | 100 | 100 | 100 | 100 | 100 | 100 | 100 | 100 | — |
| Second reactant | Tricresyl phosphate (g) | 100 | 50 | 50 | 50 | 50 | 15 | 20 | 50 | 50 |
|  | Lauroyl peroxide (g) | 0.05 | 0.2 | 0.3 | 0.5 | 0.1 | 0.3 | 0.1 | 0.05 | 0.05 |
|  | SR495B (g) | — | — | — | — | — | 35 | 30 | — | — |
| Viscosity (cps) |  | 5800 | 7000 | 7500 | 8900 | 2000 | 200000 | 15500 | 13500 | 9000 |

Referring to Table 1, it can be known from example 2 to example 4 that, the greater the amount of the lauroyl peroxide (i.e., thermal initiator) in the second reactant, the greater the viscosity of the combined solution. Moreover, it can be known from example 2 and example 8 that, the use of different types of (meth)acrylate oligomers can all produce a combined solution having a viscosity between 2000 cps and 200000 cps. Moreover, it can be known from example 8 and example 9 that, in the first reactant, regardless of whether a combination of different types of plasticizers or a single plasticizer is used, a combined solution having a viscosity between 2000 cps and 200000 cps can be obtained. Moreover, it can be known from example 6 and example 7 that, the use of a (meth)acrylate monomer in the second reactant can still produce a combined solution having a viscosity between 2000 cps and 200000 cps.

having a viscosity between 2000 cps and 200000 cps. Moreover, it can be known from example 15 and example 17 that, (meth)acrylate oligomers in an amount of 5 wt % to 50 wt % based on the total amount of the combined solution can all produce a combined solution having a viscosity between 2000 cps and 200000 cps. Moreover, referring to both Table 1 and Table 2, it can be known from example 9 and example 18 that, regardless of whether the types of the plasticizers used in the first reactant and the second reactant are the same or different, a combined solution having a viscosity between 2000 cps and 200000 cps can be obtained. Moreover, it can be known from Table 1 and Table 2 that, according to the preparation method of the combined solution without a solvent provided by the invention, by using the same raw materials, combined solutions having different viscosities can be prepared, and a sealant having matching character-

TABLE 2

|  |  | Example | | | | | | | | |
|---|---|---|---|---|---|---|---|---|---|---|
|  |  | 10 | 11 | 12 | 13 | 14 | 15 | 16 | 17 | 18 |
| First reactant | CN9021 (g) | 100 | 100 | 100 | 100 | 50 | — | — | — | — |
|  | 6113 (g) | — | — | — | — | 50 | 100 | 1000 | 24 | 100 |
|  | Tricresyl phosphate (g) | 200 | 200 | 200 | 250 | 200 | 250 | 600 | 250 | 350 |
|  | Tetraphenyl resorcinol diphosphate (g) | 100 | 100 | 100 | 100 | 100 | 0 | 200 | 100 | — |
| Second reactant | Tricresyl phosphate (g) | 100 | — | 150 | 25 | 100 | 50 | 200 | 100 | — |
|  | Tetraphenyl resorcinol diphosphate (g) | 50 | 150 | — | 10 | 50 | 50 | — | — | 50 |
|  | Lauroyl peroxide (g) | 0.2 | 0.2 | 0.2 | 0.05 | 0.1 | 0.3 | 0.25 | 0.05 | 0.05 |
| Viscosity (cps) |  | 4200 | 4800 | 5700 | 7900 | 14000 | 2500 | 170000 | 3400 | 9700 |

Referring to Table 2, it can be known from example 10 to example 12 that, ii the second reactant, regardless of whether a combination of different types of plasticizers or a single plasticizer is used, a combined solution having a viscosity between 2000 cps and 200000 cps can be obtained. Moreover, it can be known from example 10 and example 14 that, the use of a combination of different types of (meth) acrylate oligomers can still produce a combined solution istics with the corresponding LOCA can be further obtained and applied in an optical device.

Based on the above, in the preparation method of the combined solution provided in the above embodiments, a solvent-free thermal-polymerization reaction of a thermally-polymerizable composition including a first (meth)acrylate oligomer (i.e., (meth)acrylate oligomer having one or more functional groups), a thermal initiator, and a plasticizer is can led out, and therefore a combined solution applicable in an optical device such as a touch display as a sealant and having matching index of refraction and optical properties and good compatibility with a corresponding LOCA can be prepared without the use of an organic solvent. Moreover, in comparison to the known method, the preparation method of the combined solution provided by the above embodiments has the advantages of simpler process and low production cost. Moreover, in the preparation method of the combined solution provided by the above embodiments, an oligomers used as the starting material, and the issue of defects produced on the interface by an adhesive having a different viscosity is successfully overcame, and the demand of lamination for various optical devices is met.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A thermally-polymerizable composition, comprising:
   a (meth)acrylate oligomer having one or more functional groups,
   a thermal initiator; and
   a plasticizer,
   wherein based on a total weight of the thermally-polymerizable composition, an amount of the (meth)acrylate oligomer having one or more functional groups is 5 wt % to 25 wt %,
   wherein the plasticizer serves as a medium of a thermal polymerization reaction.

2. The thermally-polymerizable composition of claim 1, wherein the plasticizer comprises a first plasticizer.

3. The thermally-polymerizable composition of claim 2, wherein a boiling point of the first plasticizer is higher than a thermal polymerization initiation temperature of the thermal initiator.

4. The thermally-polymerizable composition of claim 2, wherein the first plasticizer comprises phthalate, aliphatic dibasic ester, phosphate, benzene polyacid ester, alkyl sulfonate, polyol ester, epoxy compound, or a mixture thereof.

5. The thermally-polymerizable composition of claim 1, wherein based on a total weight of the thermally-polymerizable composition, an amount of the plasticizer is 40 wt % to 94.99 wt %, and an amount of the thermal initiator is 0.01 wt % to 10 wt %.

6. The thermally-polymerizable composition of claim 1, wherein the thermal initiator comprises benzoyl peroxide, cumyl hydroperoxide, dicumyl peroxide, tert-butyl hydroperoxide, tert-butyl monoperoxymaleate, acetyl peroxide, dilauroyl peroxide, a mixture of one or more peroxides and amino acid or sulfonic acid, a mixture of one or more peroxides and a cobalt-containing compound, azobisisobutyronitrile, or a mixture thereof.

* * * * *